Sept. 23, 1947.  L. F. BEACH  2,427,654

REMOTE READING FLUX VALVE COMPASS SYSTEM

Filed March 15, 1943

INVENTOR
LENNOX F. BEACH
BY
*Herbert H. Thompson*
ATTORNEY.

Patented Sept. 23, 1947

2,427,654

UNITED STATES PATENT OFFICE 2,427,654

REMOTE READING FLUX VALVE COMPASS SYSTEM

Lennox F. Beach, Port Washington, N. Y., assignor to Purves Corporation, Springfield, Mass., a corporation of Massachusetts Original application July 30, 1940, Serial No. 348,582. Divided and this application March 15, 1943, Serial No. 479,287

17 Claims. (Cl. 33—204)

1

This invention relates to systems responsive to the intensity and direction of a magnetic field, more particularly, to systems employing stationary means for producing electrical potentials voriable in magnitude with change of intensity or direction of the field and circuits for utilizing these potentials to actuate indicating or power controlling devices.

The present invention is a division of my copending application Serial No. 348,582, filed in the United States Patent Office on July 30, 1940, which became Patent No. 2,383,459.

In U. S. Patent 2,047,609, issued to Haig Antranikian, July 14, 1936, there is disclosed a method of measuring the direction and intensity of a steady or slowly varying magnetic field by applying to an inductor member or members of magnetically permeable material carrying the flux of the field, a magneto-motive force induced by periodically varying direct current in a primary or exciting winding. This magneto-motive force being added to the field magneto-motive force produces a distorted alternating flux wave in which peaks in one direction are cut off or flattened due to the non-linear magnetic characteristic of the inductor material, the amount of distortion varying with the intensity of the steady field.

Such distortion of a flux wave is commonly explained on the basis of "saturation" of the iron or other permeable material. However, it should be noted that distortion may be of different degrees depending on the portion of the magnetization curve covered and it is not necessary in all cases that complete "saturation" be attained in order to detect or measure a steady field.

According to the present invention an improved type of inductor is provided and by the use of an alternating or pulsating exciting magneto-motive force of suitable magnitude, a measure of the steady magnetic "bias" produced in the inductor by the field is obtained whether or not the inductor becomes completely "saturated." A measuring system without the rotating inductor of the well known inductor compass is thus provided which may, in one form, be adapted to provide remote indications of the direction of a field by simultaneously measuring a plurality of components of the field and utilizing them in an indicating system similar to a Selsyn transmission system in which the remote indicating

2 device vectorially combines the components to reproduce the direction of the original field. As adapted to compass indication, the horizontal component of the earth's field is the vector whose direction is reproduced.

One object of the invention is to provide a remote indicating system responsive to the direction of a magnetic field which employs a sensitive pick-up device or transmitter without a rotating inductor member.

Another object is to provide a system for supplying a plurality of electrical potentials proportional, respectively, to components of a magnetic field for actuating a direction indicating instrument of the Selsyn type.

Another object is to provide a system in which alternating potentials proportional to a magnetic field or components thereof are produced by periodically varying the magnetic properties of a permeable member or members by stationary means.

Still another object is to provide a remote indicating compass system having the advantages of direction indicating systems of the aforementioned types.

Other objects and advantages will become apparent as the description proceeds.

Referring to the drawings.

Figure 1:
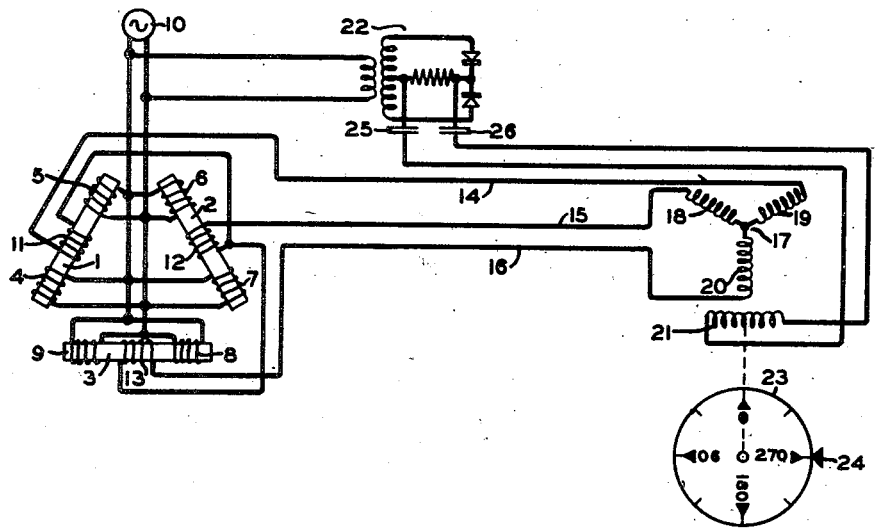
Fig. 1 is a schematic diagram of an indicating system employing a Selsyn type indicator.

In the modification shown in Fig. 1, a plurality of permeable cores or inductors is employed to generate potentials proportional to components of a magnetic field. As an illustration, Fig. 1 shows a core structure or inductor of permeable magnetic material which comprises three core legs 1, 2 and 3 positioned at angles of 120° with one another for measuring the components of the field in the directions of their respective axes. These core legs or inductors may be in the form of straight bars as shown in the aforementioned Patent 2,047,609, or preferably in the improved form shown in Fig. 2 and more particularly illustrated and described in said Letters Patent No. 2,383,459, above referred to. The latter form of inductor provides substantially closed magnetic circuits for the exciting flux, which, in addition to advantages pointed out in the above patent in connection with similar forms of magnetic circuits, renders the device insensitive to extraneous alternating fields. The core legs or inductors, 1, 2 and 3 each have symmetrically located exciting windings as for example 4 and 5 on inductor 1, 6 and 7 on inductor 2 and 8 and 9 on inductor 3, all the exciting windings being connected to A. C. source 10. In addition, the three core legs have pick-up windings 11, 12 and 13, respectively, which are shown as being Y connected, the outer terminals of the Y being connected to conductors 14, 15 and 16 of a transmission line. The voltage wave induced in each of the pick-up windings under the influence of an external magnetic field will be of a frequency double that of the source 10. Since the voltages across the three lines 14, 15 and 16 are proportional to three symmetrical components of the magnetic field they may be utilized to reproduce the direction of the field at a distant point as is done in the usual type of Selsyn system and for this purpose a Selsyn receiver 17 comprising a polycircuit stator herein illustrated as having three windings 18, 19 and 20, and a single-phase rotor winding 21 is shown. Winding 21 is supplied with current of twice the frequency of supply 10 through frequency doubler 22 and will therefore align its axis with the resultant of the three component fields due to the currents in the three stator windings. If needed, means for adjusting the phase of the output of doubler 22 may be provided. There is shown connected to rotor winding 21 a compass card 23, readable by means of an index 24 to indicate the direction of the field to which the transmitter is subjected. It will be understood that by rigidly connecting rotor 21 to a power driven object which is to be aligned in the direction of the magnetic field, receiver 17 may also be utilized as a Selsyn signal generator to generate a voltage proportional to the misalignment of said object with the field for controlling the driving means as is well known in the art of positional control systems employing Selsyn type receivers.

The circuit of the frequency doubler 22 is similar to a known full wave rectifier circuit except that the double frequency A. C. "ripple" is utilized as the output, the D. C. component in this case being blocked by condensers 25 and 26. Obviously, any type of frequency doubler may be employed.

While for purposes of illustration, there is shown in the drawings a remote control system which depends upon resolving the magnetic field at the transmitter into three components, the plurality of field components referred to is not limited to three, instruments being known for utilizing other numbers of components, for example, two rectangular components.

Figure 2:
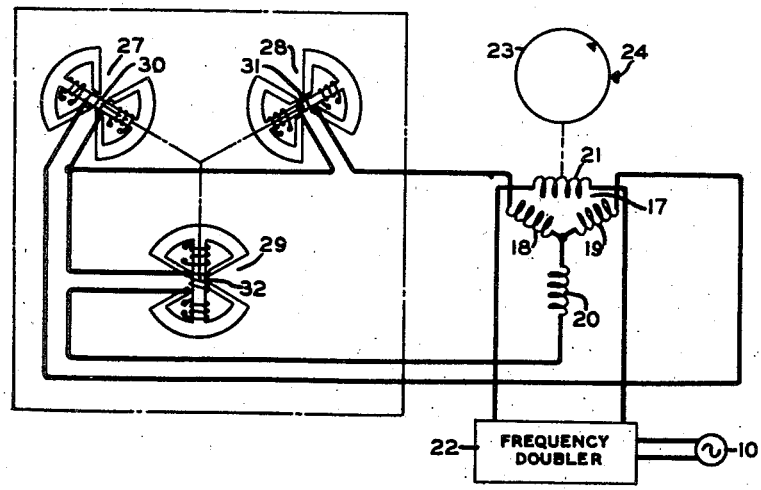
Fig. 2 is a modification of the system of Fig. 1.

It will be apparent that the improved inductor shown and described in my said co-pending application Serial No. 348,582, is particularly suitable as an element in a transmitter in a remote indicating system of the types above described. Such use of this inductor in a three component transmitter is illustrated in Fig. 2.

In this figure three inductors 27, 28 and 29, each similar in construction to the inductor described in my co-pending application above referred to, are symmetrically arranged as a transmitter and their pick-up or secondary windings 30, 31 and 32 are connected to Selsyn receiver 17, as in Fig. 1. For simplicity the connections of the exciting windings to the A. C. source are omitted.

The inductors of the present invention are preferably formed of permeable ferrous alloys such as "permalloy," "hypernik" and the like. Certain of these alloys are particularly useful in practicing the present invention since their magnetization curves have sharper breaks than the curve for iron, and so provide a sudden transition from a non-saturated to a saturated or nearly saturated condition, which is an aid in securing sensitivity.

Also, while the description refers chiefly to the use of exciting M. M. F.'s due to alternating currents, it will be understood that any periodically varying exciting current including pulsating direct current may be employed to produce these M. M. F.'s since a pulsating direct current has an alternating component or components, the steady component merely supplying an additional biasing M. M. F.

The present invention, among other important applications, is particularly adapted to be used as a remote indicating compass on moving vehicles, for example, aircraft, where the simple, compact and rugged construction of the inductor pick-up due to the absence of moving parts and the fact that it is unaffected by acceleration or vibration is of great importance. Another advantage is the ability to locate the pick-up in that part of the craft least affected by disturbing magnetic fields and actuate from it an indicator or a plurality of indicators in suitable locations, no care being required to maintain the pick-up in operative condition. Where multiple indicators are used, amplifying means may be inserted in the transmission line if necessary to supply more power than can be taken from the pick-up. Also with a single or with multiple indicators an amplifier may be used to prevent reaction of the indicator or indicators on the pick-up.

It will be further understood that in any of the forms of the invention employing remote indicators, such indicators may be oriented initially to position the stationary coils thereof in suitable relationship to the axes of the inductors of the pick-up.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a remote reading compass comprising a plurality of relatively angularly disposed inductors, coil means for producing an alternating flux in said inductors when connected to a source of alternating current energy, a source of alternating current energy connected thereto, pick-up coils associated with each of said inductors for generating potentials under the influence of an external magnetic field, motor means comprising a stator and rotor, said stator having a polycircuit winding connected in polycircuit relation with said pick-up coils and said rotor having a single phase winding, means including a frequency doubler for exciting said rotor winding from said source of energy, and indicating means associated with said rotor.

2. A remote reading compass of the earth inductor type, comprising a plurality of inductors positioned at equiangles to each other, primary and secondary coils on each, an A. C. supply, said primary coils being excited in phase from said supply, a motor of the A. C. self-synchronous type having a single phase and polycircuit windings, said polycircuit windings being connected in polycircuit relation and respectively with corresponding secondary windings on said inductors, frequency doubling means connected with said A. C. supply for supplying exciting current to the single phase winding of said motor, and a compass card driven from said motor.

3. A remote indicating compass comprising a plurality of elongated saturable magnetic core strips positioned to receive symmetrical components of the earth's magnetic field, an A. C. source, means connected to said source for producing substantially equal alternating fluxes in two portions of each of said core strips respectively flowing in opposite directions at a given instant, said fluxes alone neutralizing one another but producing a varying resultant in combination with the flux of the field, said resultant flux having a component of double the frequency of said source and proportional to the component of the earth's field along the axis of the core strips, means electrically associated with said core strips for producing potentials proportional to said several double frequency alternating flux components, an indicator including electromagnetic means for receiving said several potentials and for creating therefrom a magnetic field having the direction of the original field, an electromagnet rotatable in said field, means for exciting said magnet with A. C. of double the frequency of said source, and a transmission line connecting said core assembly and said indicator.

4. A system for the remote indication of the direction of a magnetic field comprising three symmetrically positioned inductors each comprising an elongated core of permeable magnetic material, flux collectors extending laterally from the ends of said inductors, coil means surrounding each of said inductors for applying a periodically varying exciting magneto-motive force for circulating exciting flux through a portion of each of said cores and through one of the flux collectors associated with each, coil means also surrounding each of said inductors for applying a second periodically varying exciting magneto-motive force for circulating an instantaneously equal and opposite exciting flux through another portion of each of said cores and the other of the flux collectors associated with each, a source of periodically varying current connected with both of said coil means, and a plurality of means electrically associated respectively with each of said cores for producing electro-motive forces responsive to variations of the resultant fluxes in said cores, said resultant fluxes being due to the non-linear combination in the cores of the field flux and the exciting fluxes, a polycircuit transmission line connected to said electromotive force-producing means, a remote indicator of the self-synchronous type having field windings corresponding in number and space disposition to said electromotive force-producing means and connected in said transmission line to receive the several E. M. F.'s of said E. M. F. producing means, corresponding electro-motive force-producing means and field windings being interconected to thereby indicate the direction of the field, and means for exciting the rotor winding of said indicator with alternating current of the same frequency as said transmitted E. M. F.'s.

5. In a remote reading compass comprising a plurality of relatively angularly disposed inductors, primary and secondary coils on each of said inductors, a source of periodically varying current, said primary coils being connected to said current source for producing periodically varying fluxes in said inductors, said secondary coils being adapted to generate potentials under the influence of an external unidirectional magnetic field, motor means comprising a stator and rotor, said stator having a polycircuit winding connected in polycircuit relation with said secondary coils, the windings of said stator being respectively connected with correspondingly disposed secondary coils and said rotor having a single phase winding, and means including a frequency doubler connected with said current source for exciting said rotor winding.

6. A remote reading compass system comprising a flux valve including an inductor having a plurality of relatively angularly disposed core legs of permeable magnetic material, a source of periodically varying current, coil means connected with said source and surrounding said core legs for producing a periodically varying flux in said core legs, pick-up coils associated with each of said core legs and connected in polycircuit fashion for generating potentials under the influence of an external magnetic field, and an indicator including stator windings connected in corresponding polycircuit relation to said pick-up coils and a rotor winding connected with said source of current.

7. A remote reading compass system comprising a flux valve including an inductor having a plurality of relatively angularly disposed core legs of permeable magnetic material, a source of periodically varying current, coils means connected with said source and associated with said inductor for producing a periodically varying flux in said core legs, pick-up coils associated with each of said core legs and connected in polycircuit fashion for generating potentials under the influence of an external magnetic field, an inductive device comprising stator windings connected in corresponding polycircuit relation to said pick-up coils and a rotor winding, and means for exciting said rotor winding with current of the same frequency as that of said potentials generated in said pick-up coils.

8. In a magnetic compass system, a flux valve comprising a core of permeable magnetic material having a plurality of relatively angularly disposed legs, adapted to be disposed horizontally in the earth's magnetic field, coil means associated with said core and adapted to be connected with a source of periodically varying current for producing periodically varying fluxes in said core legs, a pick-up coil associated with each core leg for generating potentials under the influence of said external magnetic field, said pick-up coils being interconnected in polycircuit fashion, a receiver having a stator comprising a polycircuit winding electrically connected in polycircuit fashion to said pick-up coils, a rotor and a winding therefor connected with a source of current having the same frequency as the output of said pick-up coils, and a compass card turned with said rotor to reproduce the orientation of said core in said field.

9. In a system of the character described, a flux valve comprising a core of permeable magnetic material, coil means associated with said core and adapted to be connected to a source of periodically varying current for producing periodically varying fluxes in said core, a plurality of pick-up coils associated with relatively angularly disposed portions of said core for generating potentials under the influence of an external magnetic field, said pick-up coils being interconnected in polycircuit fashion, a receiver having a stator comprising a polycircuit winding electrically connected in polycircuit fashion to said pick-up coils, and a rotor having a winding connected with a source of current having the same frequency as the outputs of said pick-up coils.

10. In a system of the character described, a flux valve comprising a core of permeable magnetic material, coil means associated with said core and adapted to be connected to a source of alternating current for producing periodically varying fluxes in said core, a plurality of pick-up coils associated with relatively angularly disposed portions of said core for generating potentials under the influence of an external magnetic field, said pick-up coils being interconnected in polycircuit fashion, a receiver having a stator comprising a polycircuit winding electrically connected in polycircuit fashion to said pick-up coils, and a rotor having a winding connected with said source of current.

11. An electrical inductive device for producing through interaction with a unidirectional magnetic field a three-circuit, variable alternating potential output and in which the alternating E. M. F. in each circuit varies with the orientation of the device in the magnetic field, said device comprising an inductor having three core legs of permeable magnetic material angularly disposed with respect to one another, coil means associated with said inductor and adapted to be connected with a source of single phase alternating current for producing periodically varying fluxes in said core legs, and a pickup coil associated with each core leg for generating varying potentials under the influence of said external field upon said core legs, said pickup coils being Y-connected in a three-circuit alternating output similar to that of a Selsyn transmitter, and a receiver having a polycircuit winding connected in polycircuit fashion to the output of said inductive device.

12. An electrical inductive device for producing through interaction with a unidirectional magnetic field a three-circuit, variable alternating potential output and in which the alternating E. M. F. in each circuit varies with the orientation of the device in the magnetic field, said device comprising an inductor having three substantially coplanar core legs of permeable magnetic material equi-angularly disposed with respect to one another, coil means associated with said core legs and adapted to be connected with a source of single phase alternating current for producing periodically varying fluxes in said core legs, and a pickup coil associated with each core leg for generating varying potentials under the influence of said external field upon said inductor, said pickup coils being Y-connected in a three-circuit alternating output similar to that of a Selsyn transmitter, and a receiver of the Selsyn type having a polycircuit winding connected in polycircuit fashion to the output of said inductive device.

13. An electrical inductive device for producing through interaction with a unidirectional magnetic field a three-circuit, variable alternating potential output and in which the alternating E. M. F. in each circuit varies with the orientation of the device in the magnetic field, said device comprising an inductor having three core legs of permeable magnetic material equi-angularly disposed with respect to one another in triangular fashion, coil means associated with said inductor and adapted to be connected with a source of single phase alternating current for producing periodically varying fluxes in said core legs, and a pick-up coil associated with each core leg for generating varying potentials under the influence of said external field upon said inductor, said pickup coils being Y-connected in a three-circuit alternating output similar to that of a Selsyn transmitter, and a receiver of the Selsyn type connected to the output of said coils, said receiver being powered by a source double the frequency of said first source.

14. An electrical inductive device for producing through interaction with a unidirectional magnetic field a three-circuit, variable alternating potential output and in which the alternating E. M. F. in each circuit varies with the orientation of the device in the magnetic field, said device comprising an inductor having three core legs of permeable magnetic material equi-angularly disposed with respect to one another in triangular fashion, coil means associated with said inductor and adapted to be connected with a source of single phase alternating current for producing periodically varying fluxes in said core legs, and a pickup coil associated with each core leg for generating varying potentials under the influence of said external field upon said inductor, said pickup coils being Y-connected in a three-circuit alternating output similar to that of a Selsyn transmitter, and a receiver having a polycircuit winding electrically connected in polycircuit fashion to the output of said inductive device.

15. A remote reading compass of the earth inductor type comprising an inductor of permeable magnetic material having three core legs positioned at equiangles to each other, coil means associated with said inductor for producing, when excited from an A. C. supply, a flux in said core legs, pick-up coils on each core leg, a motor of the self-synchronous type having its polycircuit windings connected in polycircuit relation and respectively with corresponding pick-up coils on said core legs, frequency doubling means connected with said A. C. supply for supplying exciting current to the rotor winding of said motor, and indicating means operable by said rotor.

16. In a remote reading compass system, a flux valve comprising an inductor of permeable magnetic material having a plurality of relatively angularly disposed core legs, a source of periodically varying current, coil means associated with said inductor and connected with said source for producing a periodically varying flux in said core legs, a pick-up coil associated with each core leg for generating potentials under the influence of an external magnetic field, and indicating means including a polycircuit stator winding electrically connected in polycircuit fashion with said pick-up coils to produce a resultant field dependent in direction upon the relationship of the external field to said inductor, and a rotor having a winding connected with said current source, said rotor being arranged in electrically cooperable relation in the field of said stator.

17. A flux valve compass system, as claimed in claim 9, further including a frequency doubler and in which said rotor winding is supplied with double frequency current from said frequency doubler which is connected with the current source employed in exciting the first-named coil means.

LENNOX F. BEACH.

(References on following page)

REFERENCES CITED

The following references are of record in the file of this patent:

UNITED STATES PATENTS

| Number | Name | Date |
|---|---|---|
| 2,240,680 | Stuart | May 6, 1941 |
| 2,313,682 | Stuart | Mar. 9, 1943 |
| Re. 21,970 | Bechberger | Dec. 9, 1941 |
| 2,047,609 | Antranikian | July 14, 1936 |
| 2,053,154 | La Pierre | Sept. 1, 1936 |
| 2,361,433 | Stuart | Oct. 31, 1944 |
| 2,360,851 | Curry | Oct. 24, 1944 |
| 2,374,166 | Beach et al. | Apr. 24, 1945 |

FOREIGN PATENTS

| Number | Country | Date |
|---|---|---|
| 451,850 | Great Britain | Aug. 10, 1936 |
| 783,731 | France | Apr. 15, 1935 |
| 98,414 | Sweden | Mar. 19, 1940 |